(12) United States Patent
Takagi

(10) Patent No.: US 9,375,981 B2
(45) Date of Patent: Jun. 28, 2016

(54) PNEUMATIC TIRE

(71) Applicant: Sumitomo Rubber Industries, Ltd., Kobe-shi, Hyogo (JP)

(72) Inventor: Keiji Takagi, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 784 days.

(21) Appl. No.: 13/672,892

(22) Filed: Nov. 9, 2012

(65) Prior Publication Data

US 2013/0133797 A1 May 30, 2013

(30) Foreign Application Priority Data

Nov. 25, 2011 (JP) .................................. 2011-258005

(51) Int. Cl.
*B60C 11/03* (2006.01)
*B60C 11/12* (2006.01)

(52) U.S. Cl.
CPC ............... *B60C 11/03* (2013.01); *B60C 11/033* (2013.04); *B60C 11/0304* (2013.04); *B60C 2011/0341* (2013.04); *B60C 2011/0372* (2013.04); *B60C 2011/0381* (2013.04); *B60C 2011/0383* (2013.04); *B60C 2011/0388* (2013.04); *B60C 2011/1254* (2013.04)

(58) Field of Classification Search
CPC ........ B60C 11/03; B60C 11/04; B60C 11/12; B60C 11/13; B60C 11/0304; B60C 11/033; B60C 11/035; B60C 11/0337; B60C 11/0339; B60C 2011/0341; B60C 2011/0358; B60C 2011/0372; B60C 2011/0374; B60C 2011/0381; B60C 2011/0383; B60C 2011/0388; B60C 2011/1254
USPC ........ 152/209.1, 209.2, 209.8, 209.9, 209.13, 152/209.16
See application file for complete search history.

(56) References Cited

U.S. PATENT DOCUMENTS

2010/0252159 A1* 10/2010 Mukai ....................... 152/209.25
2012/0118455 A1* 5/2012 Hada .......................... 152/209.8

FOREIGN PATENT DOCUMENTS

JP 2008-6987 A 1/2008

* cited by examiner

*Primary Examiner* — Eric Hug
(74) *Attorney, Agent, or Firm* — Birch, Stewart, Kolasch & Birch, LLP

(57) ABSTRACT

A pneumatic tire comprises a tread portion with a left-right asymmetry tread pattern including inboard and outboard tread edges, a pair of inboard and outboard center main grooves to form a center portion therebetween, a pair of inboard and outboard shoulder main grooves to form a pair of middle portions and a pair of shoulder portions, inboard lateral main grooves extending from the inboard tread edge beyond the tire equator without reaching the outboard center main groove, inboard shoulder lateral grooves between adjacent inboard lateral main grooves, outboard shoulder lateral grooves extending from the axially outside of the outboard tread edge without reaching the outboard shoulder main groove, inboard middle lateral grooves between adjacent inboard lateral main grooves and extending from the inboard shoulder main groove without reaching the inboard center main groove, outboard middle lateral grooves and outboard middle sub lateral grooves.

16 Claims, 5 Drawing Sheets

PNEUMATIC TIRE

BACKGROUND OF THE INVENTION

1. Field of the Invention

The present invention relates to a pneumatic tire in which the steering stability can be improved while maintaining the wet performance.

2. Description of the Related At

As shown in FIG. 5, JP2008-6987A1 discloses a pneumatic tire with a tread pattern to improve the steering stability while maintaining the wet performance.

The tire comprises a tread portion provided with a pair of circumferentially extending center main grooves (a) disposed both sides of the tire equator (Co), and a pair of circumferentially extending shoulder main grooves (b) disposed both sides of each center main groove (a) to define the tread portion into five ribs which include a center rib r1, a pair of middle ribs r2i, r2o, and a pair of shoulder ribs r3i, r3o. Center main grooves (a) include an inboard center main groove (ai) and an outboard center main groove (ao). The center rib (r1) is provided with a plurality of curved grooves y1 extending from the inboard center main groove (ai) beyond the tire equator (Co) and turning back toward the inboard center main groove (ai) without reaching the outboard center main groove (ao). Curved groove y1 are crossing each other on the tire equator Co, and thereby the center rib r1 is separated into two parts with an outboard part (e) continuously extending in the circumferential direction of the tire and an inboard inner block row including a plurality of blocks (f) divided by curved grooves y1 and y1. The middle ribs r2i provided in the inboard side is formed as a block row with a plurality of blocks (h) divided by the lateral grooves y2i, and the shoulder rib r3i provided in the inboard side is also formed as a block row with a plurality of blocks (i) divided by the lateral grooves y3i. The shoulder rib r3o is provided in the outboard side is also formed as a block row with a plurality of blocks (j) divided by the lateral grooves y3o. In the tire, curved grooves y1, lateral grooves y2 and lateral grooves y3 are disposed so that each of one y1, y2 and y3 is smoothly continued through main grooves ai and bi to be formed as a long one lateral groove Y, and thereby the inboard tread portion can improve the wet performance. However, the wet performance in the outboard middle portion r2o is not enough, and especially, the so called lateral hydro performance, which is a wet performance during cornering, is not enough. The pattern rigidity of the tire is also not enough. Accordingly, there is room for improvement as to the wet performance as well as the steering stability.

SUMMARY OF THE INVENTION

The present invention has been worked out in light of the circumstances described above, and has a main object of providing a pneumatic tire in which the steering stability can be improved while maintaining the wet performance.

In accordance with the present invention, there is provided A pneumatic tire comprising:

a tread portion having a left-right asymmetry tread pattern including an inboard tread edge and an outboard tread edge;

an inboard half-tread portion between a tire equator and the inboard tread edge;

an outboard half-tread portion between the tire equator and the outboard tread edge and having a land ratio greater than that of the inboard half-tread portion;

a pair of circumferentially extending inboard and outboard center main grooves disposed both sides of a tire equator to define a center portion there between;

a pair of circumferentially extending inboard and outboard shoulder main grooves disposed the axially outside of the inboard and outboard center main grooves;

a pair of middle portions which include an inboard middle portion defined between the inboard center main groove and the inboard shoulder main groove and an outboard middle portion defined between the outboard center main groove and the outboard shoulder main groove;

a pair of shoulder portions which include an inboard shoulder portion defined the axially outside of the inboard shoulder main groove and an outboard shoulder portion defined the axially outside of the outboard shoulder main groove;

a plurality of inboard lateral main grooves extending from the axially outside of the inboard tread edge to the axially inside of the tire beyond the tire equator without reaching the outboard center main groove;

the inboard shoulder portion being provided with a plurality of inboard shoulder lateral grooves, and each inboard shoulder lateral groove provided between adjacent inboard lateral main grooves in the circumferential direction of the tire and extending from the axially outside of the inboard tread edge toward the tire equator without reaching the inboard shoulder main groove;

the outboard shoulder portion being provided with a plurality of outboard shoulder lateral grooves, and each outboard shoulder lateral groove extending from the axially outside of the outboard tread edge toward the tire equator without reaching the outboard shoulder main groove;

the inboard middle portion being provided with a plurality of inboard middle lateral grooves, and each inboard middle lateral groove provided between adjacent inboard lateral main grooves in the circumferential direction of the tire and extending from the inboard shoulder main groove toward the tire equator without reaching the inboard center main groove;

the outboard middle portion being provided with a plurality of outboard middle lateral grooves and a plurality of outboard middle sub lateral grooves;

each said outboard middle lateral groove extending from the outboard shoulder main groove toward the tire equator without reaching the outboard center main groove so as to have an axially inner end terminating within the outboard middle portion;

each said outboard middle sub-lateral groove provided between adjacent outboard middle lateral grooves in the circumferential direction of the tire and extending from the outboard shoulder main groove toward the tire equator without reaching the outboard center main groove so as to have an axially inner end terminating the axially outside than the axially inner end of the outboard middle lateral groove; and the number of outboard middle sub lateral grooves being smaller than that of inboard middle lateral grooves.

Here, the tread edges are the axial outermost edges of the ground contacting patch which occurs under the normally inflated loaded condition when the camber angle of the tire is zero. The normally inflated loaded condition is such that the tire is mounted on the standard wheel rim and inflated to the standard pressure and loaded with 88% of the standard tire load.

In this application including specification and claims, various dimensions, positions and the like of the tire refer to those under a normally inflated unloaded condition of the tire unless otherwise noted. The normally inflated unloaded condition is such that the tire is mounted on a standard wheel rim and is inflated to a standard pressure but loaded with no tire load.

The standard wheel rim is a wheel rim officially approved or recommended for the tire by standards organizations, the standard wheel rim is the "standard rim" specified in JATMA, the "Measuring Rim" in ETRTO, the "Design Rim" in TRA or the like, for example.

The standard pressure is the "maximum air pressure" in JATMA, the "Inflation Pressure" in ETRTO, and the maximum pressure given in the "Tire Load Limits at various cold Inflation Pressures" table in TRA or the like.

The standard load is the "maximum load capacity" in JATMA, the "Load Capacity" in ETRTO, and the maximum value given in the above-mentioned table in TRA or the like.

In this application, a groove width means a width of the groove on the tread contacting surface, and a groove depth means the deepest depth of the groove from the tread contacting surface.

DETAILED DESCRIPTION

An embodiment of the present invention will be explained below with reference to the accompanying drawings.

Figure 1:
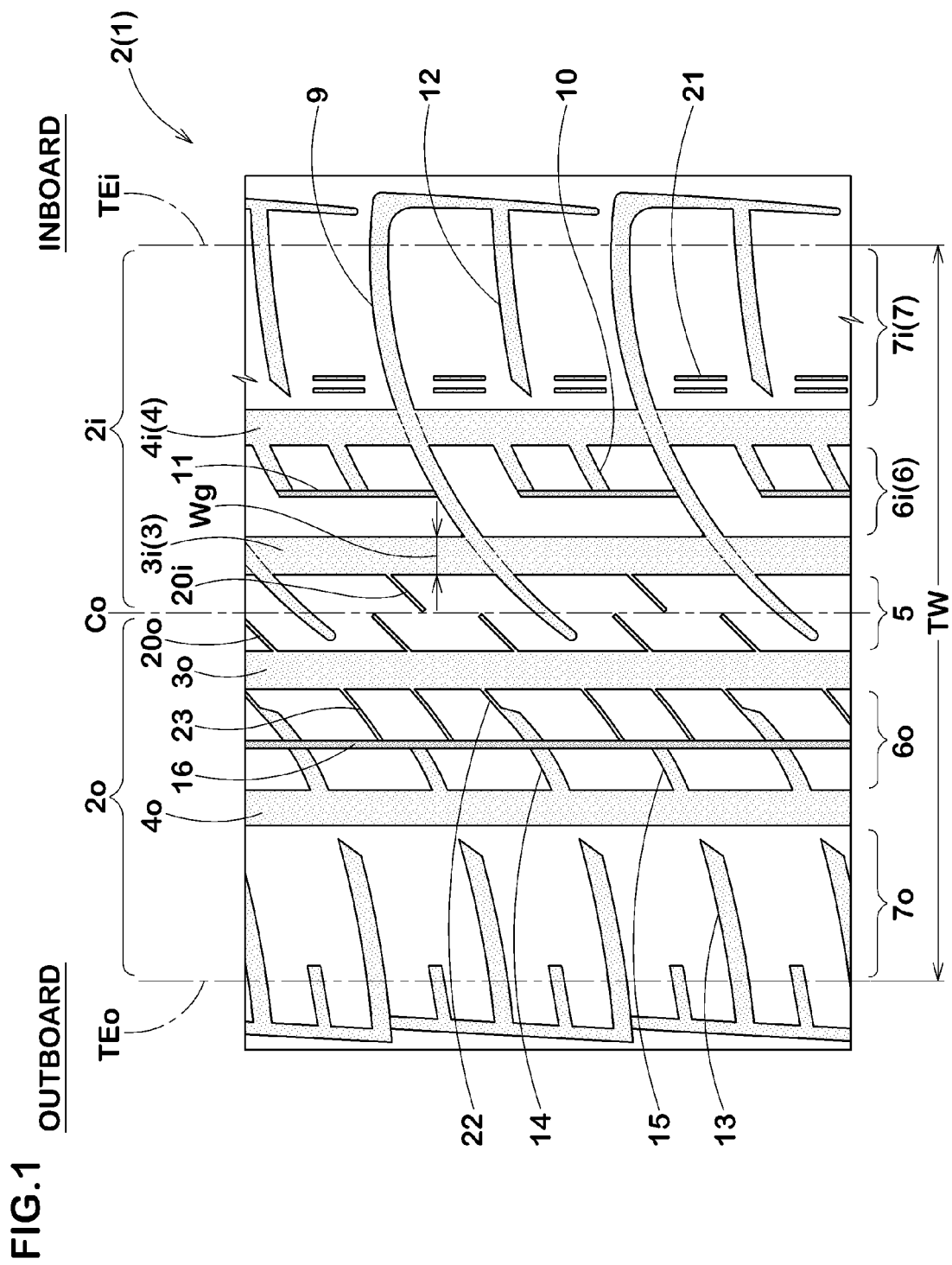
FIG. 1 is a development view of a tread portion of a pneumatic tire showing an embodiment of the present invention.

As shown in FIG. 1, a pneumatic tire 1 in accordance with the present invention includes a tread portion with a left-right asymmetry tread pattern including an inboard tread edge TEi and an outboard tread edge TEo defining a tread width TW therebetween. The tire 1 is provided with an indication (not shown) on the sidewall portion for which identifies its install direction to a vehicle, for example.

The inboard tread edge TEi refers to one of the two tread edges which is intended to be positioned towards the center of the vehicle body. The outboard tread edge TEo refers to the other tread edge which is intended to be positioned away from the center of the vehicle body. According thereto, in this application, the terms "outboard" and "inboard" are used toward the outboard tread edge and inboard tread edge, respectively, to refer relative positions in the tire axial direction.

The terms "axially inner", "axially inward" and the like are used toward the tire equator co, and the terms "axially outer", "axially outward" and the like are used toward the tread edge in order to refer relative positions in the tire axial direction.

The tread portion 2 includes: an outboard half-tread portion 2o between the tire equator Co and the outboard tread edge TEo; and an inboard half-tread portion 2i between the tire equator co and the inboard tread edge TEi. The outboard half-tread portion 2o has a land ratio Lo greater than the land ratio Li of the inboard half-tread portion 2i. In this embodiment, the land ratio Lo is preferably in a range of from 69 to 73%, and the difference between land ratios Lo–Li is preferably in a range of from 0.5 to 2.0%, for example.

The tread portion 2 of the pneumatic tire 1 is provided with a pair of circumferentially extending center main grooves 3 disposed both sides of the tire equator Co, and a pair of circumferentially extending shoulder main grooves 4 disposed the axially outside of center main grooves 3. The center main grooves 3 include: an inboard center main groove 3i which is disposed in the side of the inboard tread edge TEi than the tire equator Co; and an outboard center main groove 3o which is disposed in the side of the outboard tread edge TEo than the tire equator co. Also, the shoulder main grooves 4 include: an inboard shoulder main groove 4i which is disposed in the side of the inboard tread edge TEi than the inboard center main groove 3i; and an outboard shoulder main groove 4o which is disposed in the side of the outboard tread edge TEo than the outboard center main groove 3o.

Hence, the tread portion 2 includes: a center portion 5 between the inboard and outboard center main grooves 3i and 3o; a pair of middle portions 6 which include an inboard middle portion 6i defined between the inboard center main groove 3i and the inboard shoulder main groove 4i and an outboard middle portion 6o defined between the outboard center main groove 3o and the outboard shoulder main groove 4o; and a pair of shoulder portions 7 which include an inboard shoulder portion 7i defined between the inboard shoulder main groove 4i and the inboard tread edge TEi and an outboard shoulder portion 7o defined between the outboard shoulder main groove 7o and the outboard tread edge TEo.

Each of center main grooves 3 and outer shoulder main groove 4 is preferably formed as a straight groove extending along the circumferential direction of the tire to improve the drainage performance of the tire.

In order to further improve the drainage performance of the tread portion 2, groove widths Wg of center main grooves 3 and shoulder main grooves 4 are preferably set not less than 3.5% of the tread width TW and more preferably not less than 4.0% of the tread width TW, and groove depths Hg (not shown) thereof are preferably not less than 6.0 mm, and more preferably not less than 7.0 mm.

In order to improve the steering stability of the tire, groove width Wg of the center main grooves 3 and shoulder main grooves 4 are preferably set not more than 6.5% of the tread width TW and more preferably not more than 6.0% of the tread width Tw, and groove depths Hg thereof are preferably not more than 10.0 mm, and more preferably not more than 9.0 mm. In view of both wet performance and the steering stability, groove widths Wg of center main grooves 3 are preferably greater than groove widths Wg of shoulder main grooves 4.

In this embodiment, the inboard center main groove 3i is symmetrically disposed with the outboard center main groove 3o with respect to the tire equator co. Similarly, the inboard shoulder main groove 4i is also symmetrically disposed with the outboard shoulder main groove 4o with respect to the tire equator Co.

Figure 2:
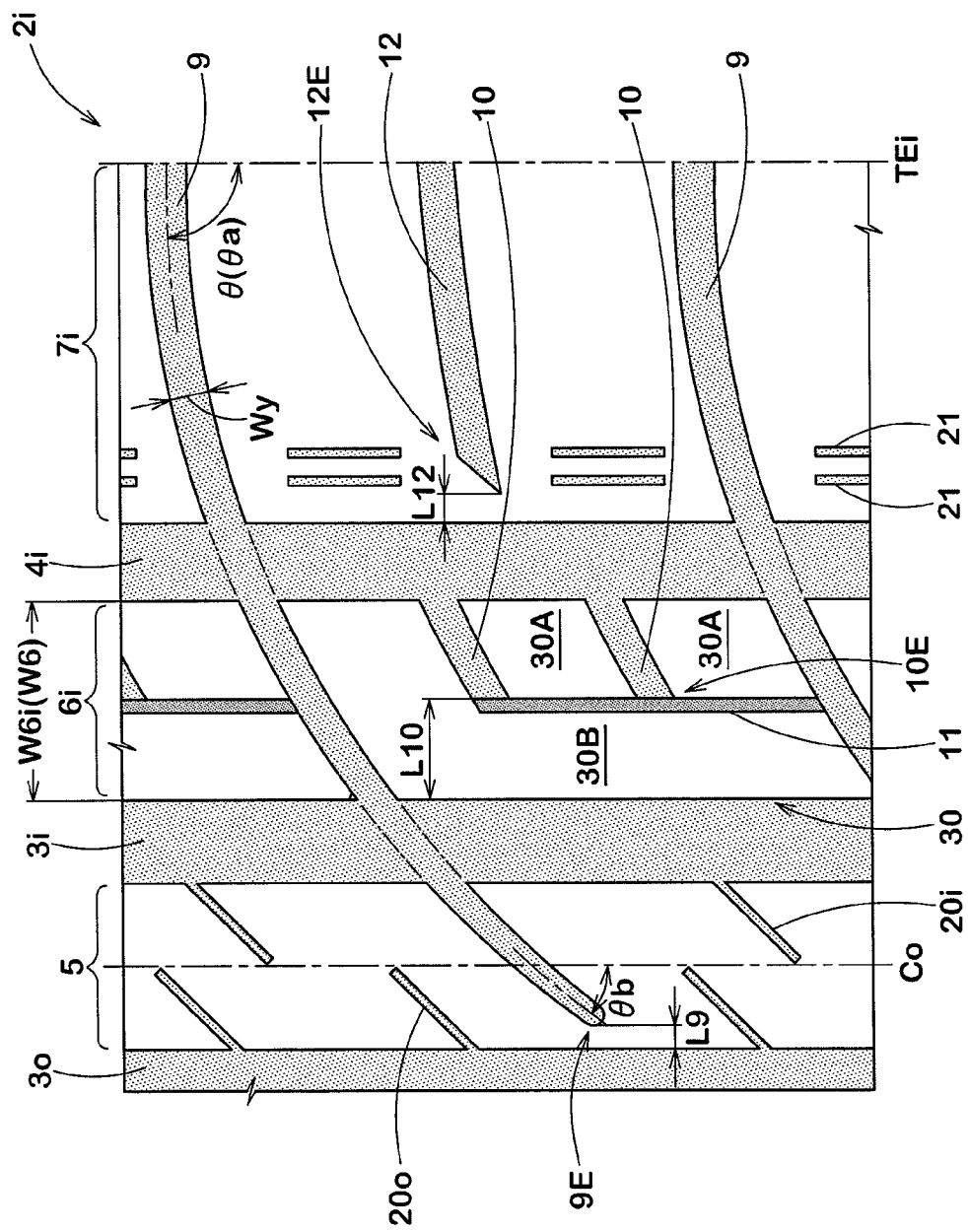
FIG. 2 is a partial enlarged view of an inboard of the tread portion in FIG. 1.

Next, as shown in FIG. 2, the tread portion 2 is provided with a plurality of inboard lateral main grooves 9 extending from the axially outside of the inboard tread edge TEi to the axially inside of the tire beyond the tire equator Co without reaching the outboard center main groove 3o. Each inboard lateral main groove 9 in this embodiment is a smoothly curved groove with an arc-shaped having an inclination angle θ with respect to the circumferential direction of the tire which is gradually decreasing toward the axially inside of the tire. Each inboard lateral main groove 9 preferably has an inclination angle θa in a range of from 70 to 100 degrees on the inboard tread edge TEi. Moreover, the inboard lateral main groove 9 preferably has an inclination angle θb in a range of from 20 to 50 degrees on the tire equator co. The inboard lateral main groove 9 in this embodiment has a groove width Wy which is also decreasing toward the axially inside of the tire. Since the inboard lateral main groove 9 wholly and smoothly extends in the inboard half-tread portion 2i, the drainage performance of the inboard half-tread portion 2i can be improved. Namely, such the inboard lateral main groove 9 improves the wet performance of the tire as well as the hydro performance during straight running while maintaining the steering stability of the tire. Moreover, since the inboard lateral main groove 9 has an axially inner end 9E which terminates within the center portion 5, it makes the rigidity of the center portion 5 maintain higher, and thereby the straight running stability of the tire can be also improved. Here, if the distance L9 between the inner end 9E of the inboard lateral main groove 9 and the outboard center main groove 3o is too small, the rigidity of the center portion 5 tends to be lower. On the other hand, if the distance L9 is too large, the drainage performance of the center portion 5 tends to deteriorate, and thereby it may be difficult to manage both the wet performance and the steering stability of the tire. In this point of view, the distance L9 is preferably in a range of from 1 to 5 mm.

The center portion 5 is provided with: a plurality of outboard center sipes 20o extending from the outboard center main groove 3o toward the tire equator co; and a plurality of inboard center sipes 20i extending from the inboard center main groove 3i toward the tire equator Co. These sipes 20i and 20o have axially inner ends which terminate close to the tire equator co. Especially, distances between inner ends of sipes 20i and 20o and the tire equator are preferably not more than 3 mm. These sipes 20i and 20o are possible to improve the wet performance on wet road with thin water film while maintaining the rigidity of the center portion 5. In this embodiment, one inboard center sipe 20i is provided between adjacent inboard lateral main grooves 9 in the circumferential direction of the tire, and one outboard center sipe 20o is provided between one inboard lateral main groove 9 and one inboard center sipe 20i.

The inboard middle portion 6i is provided with a plurality of inboard middle lateral grooves 10. Each inboard middle lateral groove 10 is provided between adjacent inboard lateral main grooves 9 in the circumferential direction of the tire and extends substantially in parallel with inboard lateral main grooves 9 from the inboard shoulder main groove 4i to the axially inside of the tire. The middle lateral groove 10 has an axially inner end 10E which terminates within the inboard middle portion 6i without reaching the inboard center main groove 3i. In this embodiment, two inboard middle lateral grooves 10 are provided between adjacent inboard lateral main grooves 9 in the circumferential direction of the tire. The distance L10 between the inner end 10E of the inboard middle lateral groove 10 and the inboard center main groove 3i is preferably in a range of from 40 to 60% of the axial width W6i of the inboard middle portion 6i.

The inboard middle portion 6i is provided with a plurality of inboard middle sub grooves 11. Each inboard middle sub groove 11 extends along the circumferential direction of the tire from the axially inner end 10E of one of the inboard middle lateral groove 10 to one of inboard lateral main grooves 9 through the axially inner end 10E of the other one of the inboard middle lateral groove 10. Accordingly, the inboard middle portion 6i is divided by inboard lateral main grooves 9 into a plurality of middle blocks 30, and each middle block 30 is further divided into three sections which include: a pair of first middle block sections 30A with small shapes separated by inboard middle lateral grooves 10 and the inboard middle sub grooves 11; and a second middle block section 30B with a large L-shaped compared to each first middle block section 30A which serves to maintain the rigidity of the inboard middle portion 6i.

Next, the inboard shoulder portion 7i is provided with a plurality of inboard shoulder lateral grooves 12. Each inboard shoulder lateral groove 12 is provided between adjacent inboard lateral main grooves 9 in the circumferential direction of the tire and extends in parallel with inboard lateral main grooves 9 from the axially outside of the inboard tread edge TEi toward the tire equator co. Moreover, the inboard shoulder lateral groove 12 has an axially inner end 12E which terminates within the inboard shoulder portion 7i without reaching the inboard shoulder main groove 4i. Here, if the distance L12 between the inner end 12E of the inboard shoulder lateral groove 12 and the inboard shoulder main groove 4i is too small, the rigidity of the inboard shoulder portion 7i tends to be lower. On the other hand, if the distance L12 is too large, the drainage performance of the inboard shoulder portion 7i tends to deteriorate, and thereby it may be difficult to manage both the wet performance and the steering stability of the tire. In this point of view, the distance L12 is preferably in a range of from 1 to 5 mm, as well as the distance L9.

The inboard shoulder portion 7i is provided with a plurality of circumferentially extending inboard shoulder sipes 21 by the side of the inboard shoulder main groove 4i. Each sipe 21 has both ends which terminate within the inboard shoulder portion 7i. These sipes 21 serve to improve the operability of the tire on wet road by increasing circumferential edges. These sipes 21 are preferably provided in an area which has a width of not less than 3 mm and not more than 13 mm from the inboard shoulder main groove 4i. If these sipes 21 are provided outside of the area above, the so called edge-effect of sipes 21 tends to deteriorate, and thereby the operability of the tire on wet road may be deteriorated.

Figure 3:
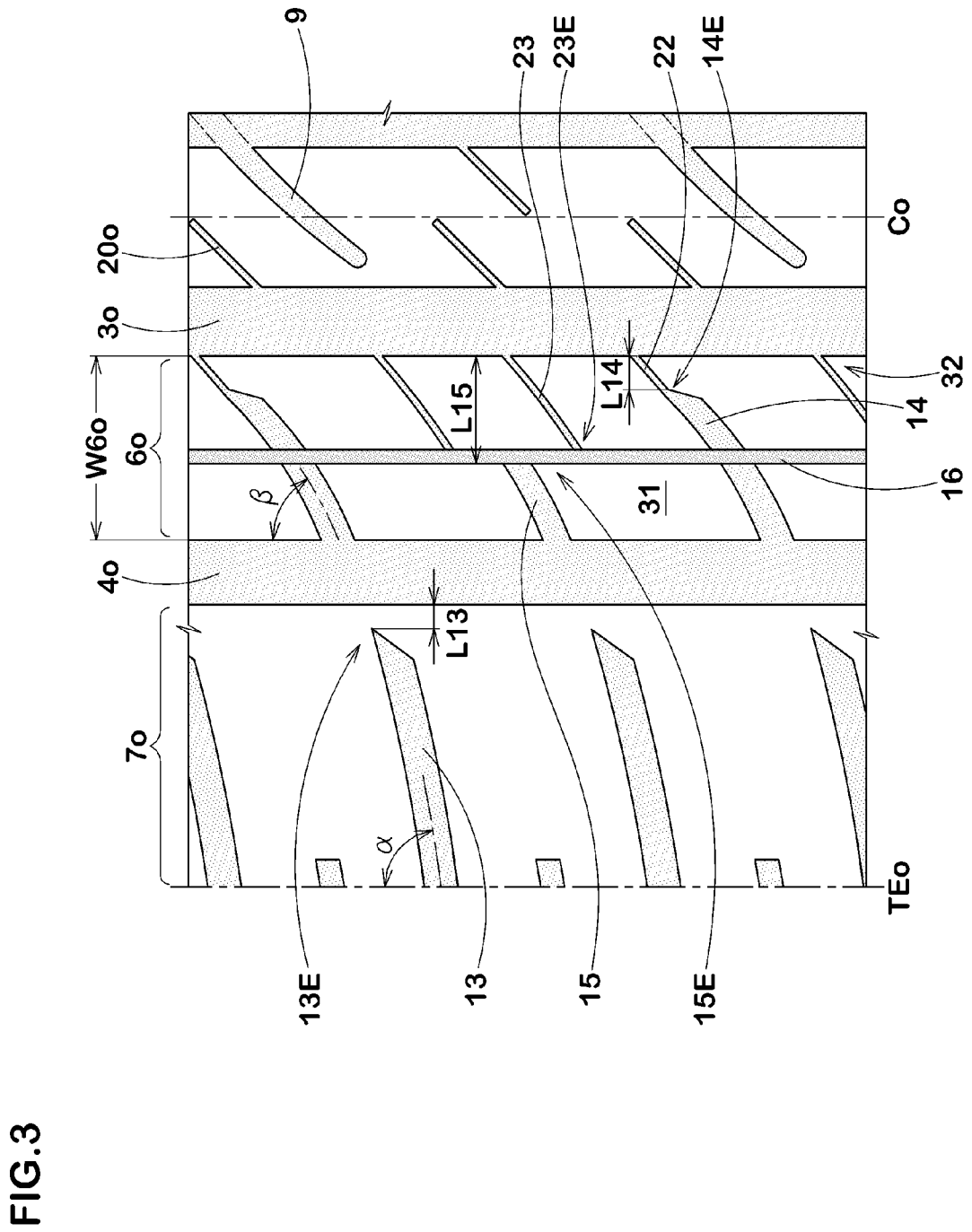
FIG. 3 is a partial enlarged view of an outboard of the tread portion in FIG. 1.

Next, as shown in FIG. 3, the outboard shoulder portion 7o is provided with a plurality of outboard shoulder lateral grooves 13. Each outboard shoulder lateral groove 13 extends from the axially outside of the outboard tread edge TEo toward the tire equator co with an inclination angle α of from 60 to 90 degrees with respect to the circumferential direction of the tire. Also, each outboard shoulder lateral grooves 13 has an axially inner end 13E which terminates within the outboard shoulder portion 7o without reaching the outboard shoulder main groove 4o. Here, if the distance L13 between the inner end 13E of the outboard shoulder lateral groove 13 and the outboard shoulder main groove 4o is too small, the rigidity of the outboard shoulder portion 7o tends to be lower. On the other hand, if the distance L13 is too large, the drainage performance of the outboard shoulder portion 7o tends to deteriorate, and thereby it may be difficult to manage both the wet performance and the steering stability of the tire. In this point of view, the distance L13 is preferably in a range of from 3 to 8 mm. Moreover, the pitch-number of outboard shoulder lateral grooves 13 in the outboard shoulder portion 7o is double to the pitch-number of the inboard lateral main grooves 9.

The outboard middle portion 6o is provided with a plurality of outboard middle lateral grooves 14 and a plurality of outboard middle sub lateral grooves 15.

Each outboard middle lateral groove 14 extends from the outboard shoulder main groove 4o toward the tire equator co with an inclination angle β of from 40 to 80 degrees with respect to the circumferential direction of the tire. The outboard middle lateral groove 14 has an axially inner end 14E which terminates within the outboard middle portion 6o without reaching the outboard center main groove 3o. In this embodiment, the angle β of the outboard middle lateral groove 14 is set smaller than the angle α of the outboard shoulder lateral groove 13.

Each outboard middle sub lateral groove 15 is provided between adjacent outboard middle lateral grooves 14 in the circumferential direction of the tire and extends in parallel with outboard middle lateral grooves 14 from the outboard shoulder main groove 4o toward the tire equator Co. The outboard middle sub lateral groove 15 also has an axially inner end 15E which terminates the axially outside of the tire than the axially inner end 14E of the outboard middle lateral groove 14 without reaching the outboard center main groove 3o. These lateral grooves 14, 15 and the outboard shoulder lateral groove 13 are inclined the same direction with inboard lateral main grooves 9, inboard middle lateral grooves 10 and inboard shoulder lateral grooves 12. Here, if the distance L14 between the inner end 14E of the outboard middle lateral groove 14 and the outboard center main groove 3o is too small, the rigidity of the outboard middle portion 6o tends to be lower. On the other hand, if the distance L14 is too large, the drainage performance of the outboard middle portion 6o tends to deteriorate, and thereby it may be difficult to manage both the wet performance and the steering stability of the tire. In this point of view, the distance L14 is preferably in a range of from 3 to 8 mm, as well as the distance L13. Moreover, the distance L15 between the axially inner end 15E of the outboard middle sub lateral groove 15 and the outboard center main groove 3o is preferably in a range of from 40 to 60% of the axial width who of the outboard middle portion 6o.

Here, the pitch-number of inboard lateral main grooves 9 is the same as that of outboard middle lateral grooves 14. Moreover, two inboard middle lateral grooves 10 are provide between each adjacent inboard lateral main grooves 9 in the circumferential direction of the tire, for example. In addition, one outboard middle sub lateral grooves 15 is provided each between adjacent outboard middle lateral grooves 14, 14 in the circumferential direction of the tire. Namely, the total number of outboard middle sub lateral grooves 15 is less than that of inboard middle lateral grooves 10. In this embodiment, the total number of outboard middle sub lateral grooves 15 is half of that of inboard middle lateral grooves 10.

The outboard middle portion 6o is also provided with a plurality of outboard first middle sipes 22 and outboard second middle sipes 23.

Each outboard first middle sipe 22 extends from the outboard center main groove 3o to the axially inner end 14E of the outboard middle lateral groove 14. Each outboard second middle sipe 23 is provide between adjacent outboard first middle sipes 23 in the circumferential direction of the tire and extends from the outboard center main groove 3o toward the axially outside of the tire without reaching the outboard shoulder main groove 4o. These sipes 22 and 23 are especially possible to improve the running performance on wet road with thin water film while maintaining the rigidity of the outboard middle portion 6o. In this embodiment, Two outboard second middle sipes 23 are provided in each between adjacent outboard first middle sipes 23. Especially, since the area around the outboard center main groove 3o has a great effect on steering stability of the tire, it is preferable that only these sipes 22 and 23 are connected to the outboard center main groove 3o. Namely, no grooves or sipes except for sipes 22 and 23 is connected to the outboard center main groove 3o to improve the steering stability while maintaining the rigidity around the outboard center main groove 3o.

The outboard middle portion 6o is also provided with a circumferentially extending outboard middle sub groove 16. The outboard middle sub groove 16 crosses each outboard middle lateral groove 14, and is connected to the axially outer end 23E of each outboard second middle sipe 23 and each axially inner end 15E of outboard middle sub lateral groove 15. By providing the outboard middle sub groove 16, the outboard middle portion 6o is divided into two portions which comprise: a block row including a plurality of blocks 31 with rectangular shapes disposed the axially outside of the outboard middle sub groove 16; and a rib portion 32 continuously extending in the circumferential direction of the tire.

Such the outboard middle sub-groove 16 serves to improve the drainage performance of the outboard middle-portion 6o so that the lateral hydro performance of the tire can be improved.

Since the pneumatic tire 1 in accordance with the present invention has inboard lateral main grooves 9 which wholly and smoothly extend in the inboard half-tread portion 2i, the wet performance of the inboard half-tread portion 2i can be improved while maintaining the rigidity of the tread portion 2. In addition, by providing both outboard middle lateral grooves 14 and sub lateral grooves 15, the outboard middle portion 6o achieves an improved drainage performance, and thereby the lateral hydro performance can be improved. Generally, not only the drainage performance but also the pattern rigidity of the tread portion 2 has an effect on the lateral hydro performance. In this embodiment of the present invention, since the number of outboard middle sub lateral grooves 15 is set smaller than that of inboard middle lateral grooves 10, it is possible to manage both drainage performance and the tread rigidity of the tire, and thereby the lateral hydro performance can be improved.

Each of inboard lateral main grooves 9, inboard shoulder lateral grooves 12, inboard middle lateral grooves 10, outboard shoulder lateral grooves 13, outboard middle lateral grooves 14 and outboard middle sub lateral grooves 15 has end which terminates within each land portion. Accordingly, each of center portion 5, middle portions 6i, 6o and shoulder portions 7i, and 7o has a high rigidity such that the steering stability can be improved.

Here, although groove widths Wy and depths Hy (not shown) of inboard lateral main grooves 9, inboard middle lateral grooves 10, inboard shoulder lateral grooves 12, outboard shoulder lateral grooves 13, outboard middle lateral grooves 14, outboard middle sub lateral grooves 15 and outboard middle lateral sub grooves 16 are not particularly limited, groove widths Wy are preferably not less than 2 mm, and more preferably not less than 3 mm in order to improve the drainage performance, and groove depths Hy are preferably not less than 1 mm, and more preferably not less than 3 mm in view of the tread rigidity. In view of the rigidity of the tread pattern, groove widths Wy are preferably not more than 60% of groove widths Wg of center main grooves 3, and more preferably not more than 50%. In the same way, groove depths Hy are preferably not more than 90% of groove depths Hg of center main grooves 3, and more preferably not more than 80%. Especially, inboard middle sub grooves 11 preferably have groove widths Wy and depths Hy both which are smaller than those of inboard lateral main grooves 9 and inboard middle lateral grooves 10. In addition, the outboard middle sub groove 16 preferably have a groove width Wy and depth Hy which are smaller than those of outboard middle lateral grooves 14 and outboard middle lateral sub grooves 15.

Outboard center sipes 20o, inboard center sipes 20i, inboard shoulder sipes 21, outboard first middle sipes 22 and outboard second middle sipes 23 have widths of not more than 1.5 mm and depths of not more than that of groove depths Hy above, respectively.

Figure 4:
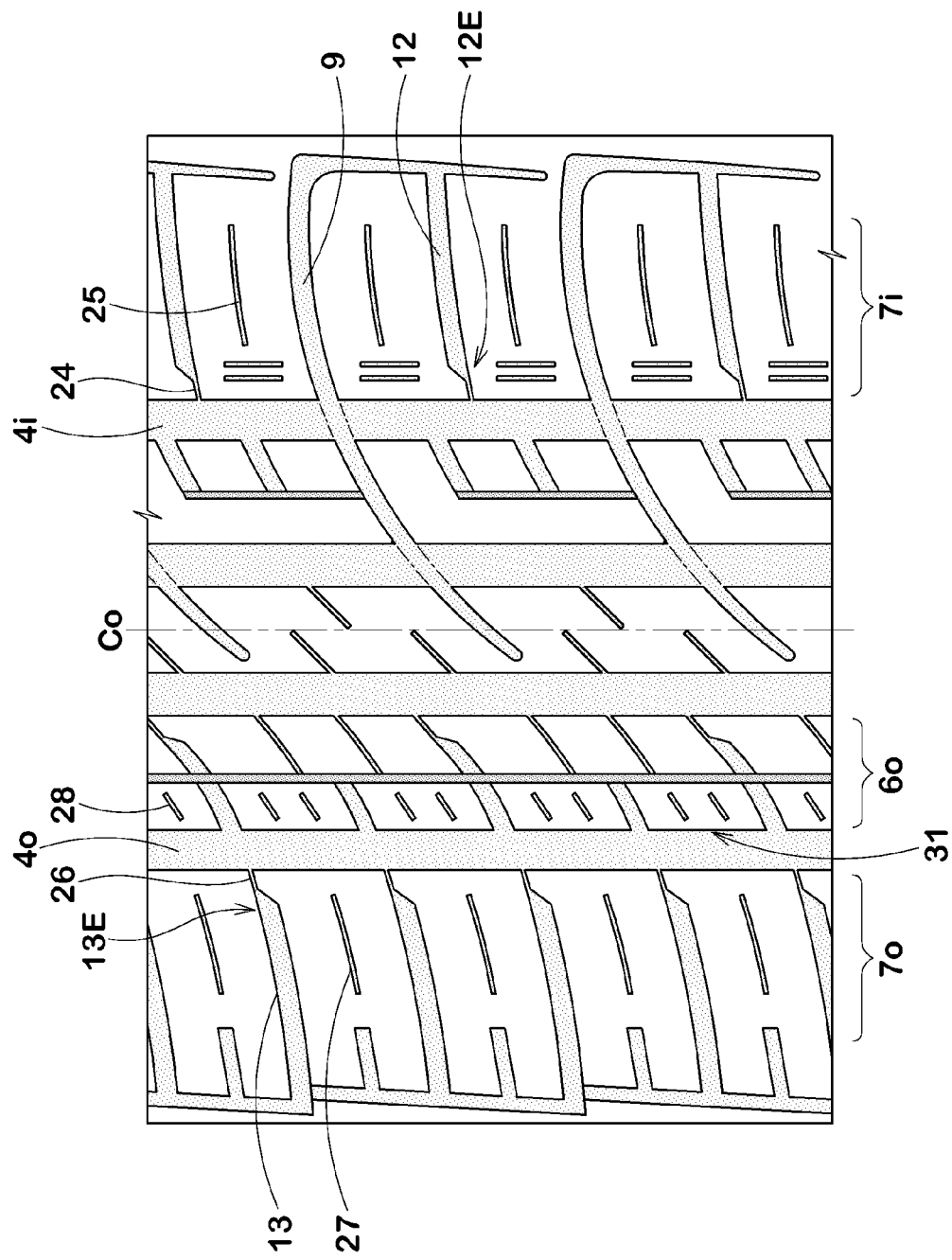
FIG. 4 is a development view of a tread portion of a pneumatic tire showing another embodiment of the present invention.

FIG. 4 shows another embodiment of the present invention. In this embodiment, the inboard shoulder portion 7i is provided with a plurality of sipes 24 which connect between the axially inner ends 12E of inboard shoulder lateral grooves 12 and the inboard shoulder main groove 4i. In addition, the inboard shoulder portion 7i is provided with a sipe 25 between adjacent one inboard shoulder lateral groove 12 and one inboard lateral main groove 9. Each sipe 25 has both ends which terminate within the inboard shoulder portion 7i and extends substantially in parallel with inboard lateral main grooves 9.

The outboard shoulder portion 7o is provided with a plurality of sipes 26 which connect between the axially inner ends 13E of outboard shoulder lateral grooves 13 and the outboard shoulder main groove 4o. In addition, the outboard shoulder portion 7o is provided with a sipe 27 between adjacent one outboard shoulder lateral grooves 13. Each sipe 27 has both ends which terminate within the outboard shoulder portion 7o and extends substantially in parallel with outboard shoulder lateral grooves 13. Also, the outboard middle portion 6o is provided with a sipe 28 in each middle block 31, and each sipe 28 has both ends which terminate within each block 31 and extends substantially in parallel with outboard middle lateral grooves 14.

The present invention is more specifically described and explained by means of the following Examples and References. It is to be understood that the present invention is not limited to these Examples.

Comparison Test

Pneumatic tires for passenger cars of size 225/55R17 with basic tread patterns of FIG. 1 except for details shown in Table 1 were made, and then steering stability and lateral hydro performance were tested. As to the Ref.1, the tire with a tread pattern shown in FIG. 5 was used. Major common specifics and test method are as follows.

Tread width TW: 180 mm
Groove width Wg of center main groove: 10 mm
Groove depth Hg of center main groove: 9 mm
Groove width Wg of shoulder main groove: 9 mm
Groove depth Hg of shoulder main groove: 9 mm
Width W5 of center portion: 21 mm
Width W6 of middle portion: 26 mm
Width W7 of shoulder portion: 36 mm
Groove width Wy of inboard lateral main groove: 8 mm
Groove depth Hy of inboard lateral main groove: 7 mm
Groove width Wy of inboard shoulder lateral groove: 6 mm
Groove depth Hy of inboard shoulder lateral groove: 4 mm
Groove width Wy of outboard shoulder lateral groove: 6 mm
Groove depth Hy of outboard shoulder lateral groove: 4 mm
Groove width Wy of inboard middle lateral groove: 7 mm
Groove depth Hy of inboard middle lateral groove: 4 mm
Groove width Wy of outboard middle lateral groove: 7 mm
Groove depth Hy of outboard middle lateral groove: 4 mm
Groove width Wy of outboard middle sub lateral groove: 2 mm
Groove depth Hy of outboard middle sub lateral groove: 4 mm Steering Stability Test:

The test tires were mounted on wheel rims of 17×7JJ with an inner pressure of 200 kPa, and installed in a vehicle (Japanese FR car with a displacement of 3,500 cc) as four wheels, the test driver drove the vehicle on dry asphalt road, and evaluated steering stability such as the steering response during cornering, stiffness and cornering grip. The results are indicated in Table 1 by scores based on Ref.1 being 100, wherein the larger the value, the better the performance is.

Lateral Hydro Performance Test:

The test vehicle described above was entered into a course with a water puddle 5 mm deep and 20 m long, on an asphalt road surface with a radius of 100 m, with stepwise speed increase. Then, lateral acceleration (lateral G) of the vehicle was measured, and average lateral G of the front wheels at speeds of 50 to 80 km/h was calculated. Calculation results are shown with an index of 100 representing a value in Ref.1. Larger the values, the better the performance is.

TABLE 1

Figure 5:
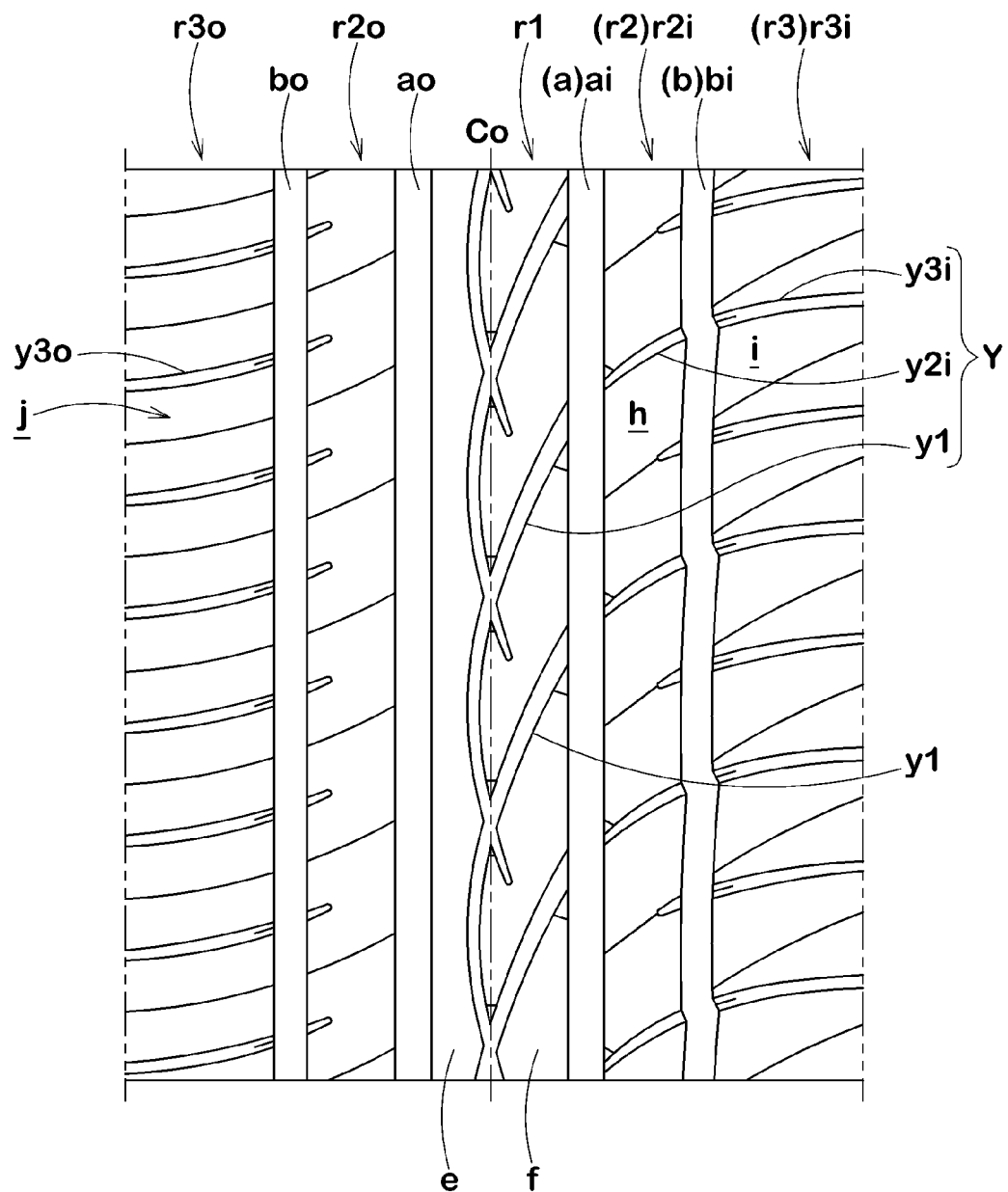
FIG. 5 is a development view of a tread portion of a conventional pneumatic tire.

|  | Ref. 1 | Ref. 2 | Ref. 3 | Ex. 1 | Ex. 2 | Ex. 3 | Ex. 4 | Ex. 5 | Ex. 6 | Ex. 7 |
| --- | --- | --- | --- | --- | --- | --- | --- | --- | --- | --- |
| Tread pattern | FIG. 5 | FIG. 1 | FIG. 1 | FIG. 1 | FIG. 1 | FIG. 1 | FIG. 1 | FIG. 1 | FIG. 1 | FIG. 1 |
| Outboard land ratio Lo (%) | 71 | 71 | 71 | 71 | 71 | 71 | 71 | 71 | 71 | 71 |
| Inboard land ratio Li (%) | 70 | 70 | 70 | 70 | 70 | 70 | 70 | 70 | 70 | 70 |
| Distance L9 (mm) | — | 0 | 3 | 3 | 5 | 1 | 3 | 3 | 3 | 3 |
| Distance L12 (mm) | — | 0 | 3 | 3 | 5 | 1 | 3 | 3 | 3 | 3 |
| Distance L13 (mm) | — | 0 | 5 | 5 | 8 | 3 | 5 | 5 | 5 | 5 |
| Ratio L10/W6 (%) | — | 50 | 50 | 50 | 50 | 50 | 50 | 50 | 50 | 50 |
| Distance L14 (mm) | — | 0 | 5 | 5 | 8 | 3 | 5 | 5 | 5 | 5 |
| Ratio L15/W6 (%) | — | 50 | 50 | 50 | 50 | 50 | 50 | 50 | 50 | 50 |
| Number of outboard middle sub lateral grooves between adjacent outboard middle lateral grooves | — | 1 | 1 | 1 | 1 | 1 | 1 | 1 | 1 | 1 |
| Number of inboard middle lateral grooves between adjacent inboard lateral main grooves | — | 2 | 1 | 2 | 2 | 2 | 2 | 2 | 2 | 2 |
| Outboard center sipe | — | Provided | Provided | Provided | Provided | Provided | Provided | Provided | Provided | Absence |
| Outboard middle first sipe | — | Absence | Provided | Provided | Provided | Provided | Provided | Provided | Provided | Absence |
| Outboard middle second sipe | — | Provided | Provided | Provided | Provided | Provided | Provided | Provided | Provided | Absence |
| Outboard middle sub groove | — | Provided | Provided | Provided | Provided | Provided | Absence | Provided | Absence | Absence |
| Inboard middle sub groove | — | Provided | Provided | Provided | Provided | Provided | Absence | Absence | Provided | Absence |
| Inboard shoulder sipe | — | Provided | Provided | Provided | Provided | Provided | Provided | Provided | Provided | Absence |
| Steering stability (Score) | 100 | 70 | 120 | 120 | 150 | 90 | 130 | 125 | 125 | 150 |
| Lateral hydro performance (Index) | 100 | 160 | 105 | 120 | 90 | 150 | 110 | 115 | 115 | 90 |

From the test results, it was confirmed that lateral hydro performance and steering stability of example tires in accordance with the present invention can be effectively improved compared to references.

The invention claimed is:

1. A pneumatic tire comprising:
   a tread portion having a left-right asymmetry tread pattern including an inboard tread edge and an outboard tread edge;
   an inboard half-tread portion between a tire equator and the inboard tread edge;
   an outboard half-tread portion between the tire equator and the outboard tread edge and having a land ratio greater than that of the inboard half-tread portion;
   a pair of circumferentially extending inboard and outboard center main grooves disposed both sides of a tire equator to define a center portion there between;
   a pair of circumferentially extending inboard and outboard shoulder main grooves disposed an axially outside of the inboard and outboard center main grooves;
   a pair of middle portions which include an inboard middle portion defined between the inboard center main groove and the inboard shoulder main groove and an outboard middle portion defined between the outboard center main groove and the outboard shoulder main groove;
   a pair of shoulder portions which include an inboard shoulder portion defined the axially outside of the inboard shoulder main groove and an outboard shoulder portion defined lay the axially outside of the outboard shoulder main groove;
   a plurality of inboard lateral main grooves extending from the axially outside of the inboard tread edge to the axially inside of the tire beyond the tire equator without reaching the outboard center main groove;
   the inboard shoulder portion being provided with a plurality of inboard shoulder lateral grooves, each inboard shoulder lateral groove extending from axially outside of the inboard tread edge toward the tire equator without reaching the inboard shoulder main groove;
   the outboard shoulder portion being provided with a plurality of outboard shoulder lateral grooves, each outboard shoulder lateral groove extending from the axially outside of the outboard tread edge toward the tire equator without reaching the outboard shoulder main groove;
   the inboard middle portion being provided with a plurality of inboard middle lateral grooves, and each inboard middle lateral groove provided between adjacent inboard lateral main grooves in the circumferential direction of the tire and extending from the inboard shoulder main groove toward the tire equator without reaching the inboard center main groove;
   the outboard middle portion being provided with a plurality of outboard middle lateral grooves and a plurality of outboard middle sub lateral grooves;
   each said outboard middle lateral groove extending from the outboard shoulder main groove toward the tire equator without reaching the outboard center main groove so as to have an axially inner end terminating within the outboard middle portion;
   each said outboard middle sub-lateral groove provided between adjacent outboard middle lateral grooves in the circumferential direction of the tire and extending from the outboard shoulder main groove toward the tire equator without reaching the outboard center main groove so as to have an axially inner end terminating the axially outside than the axially inner end of the outboard middle lateral groove;
   the number of outboard middle sub lateral grooves being smaller than that of inboard middle lateral grooves; and
   a distance between the axially inner end of the inboard lateral main groove and the outboard center main groove is in a range of from 1 to 5 mm.

2. The tire according to claim 1, wherein
   the center portion is provided with a plurality of outboard center sipes extending from the outboard center main groove toward the tire equator,
   the outboard middle portion is provided with a plurality of outboard first middle sipes and outboard second middle sipes,
   each outboard first middle sipe extends from the outboard center main groove to the axially inner end of the outboard middle lateral groove,
   each outboard second middle sipe is provide between adjacent outboard first middle sipes in the circumferential direction of the tire and extends from the outboard center main groove toward axially outside of the tire without reaching the outboard shoulder main groove, and
   only these sipes are connected to the outboard center main groove.

3. The tire according to claim 2, wherein
   the outboard middle portion is provided with a circumferentially extending outboard middle sub groove,
   the outboard middle sub groove crosses each outboard middle lateral groove,
   each outboard second middle sipe has an axially outer end connected to the outboard middle sub groove, and
   each outboard middle sub lateral groove has an axially inner end connected to the outboard middle sub groove.

4. The tire according to claim 1, wherein
   the pitch-number of inboard lateral main grooves is the same as the pitch-number of outboard middle lateral grooves,
   two inboard middle lateral grooves are provide between adjacent inboard lateral main grooves in the circumferential direction of the tire, and
   one outboard middle sub lateral grooves is provided between adjacent outboard middle lateral grooves in the circumferential direction of the tire.

5. The tire according to claim 1, wherein
   the inboard middle portion is provided with a plurality of inboard middle sub grooves, and
   each inboard middle sub groove extends in the circumferential direction of the tire from an axially inner end of the inboard middle lateral groove to one of inboard lateral main grooves.

6. The tire according to claim 1, wherein the inboard shoulder portion is provided with a plurality of circumferentially extending sipes by the side of the inboard shoulder main groove.

7. The tire according to claim 1, wherein a distance between the axially inner end of the inboard middle lateral groove and the inboard center main groove is in a range of from 40 to 60% of the axial width of the inboard middle portion.

8. The tire according to claim 1, wherein
   the inboard middle portion is divided by inboard lateral main grooves into a plurality of middle blocks, and
   each middle block is further divided into three sections which include a pair of first middle block sections each having a rectangular shape separated by inboard middle lateral grooves and the inboard middle sub grooves, and a second middle block section having an L-shape.

9. The tire according to claim 1, wherein a distance between the axially inner end of the inboard shoulder lateral groove and the inboard shoulder main groove is in a range of from 1 to 5 mm.

10. The tire according to claim 1, wherein a distance between the axially inner end of the outboard shoulder lateral groove and the outboard shoulder main groove is in a range of from 3 to 8 mm.

11. The tire according to claim 1, wherein a distance between the axially inner end of the outboard middle lateral groove and the outboard center main groove is in a range of from 3 to 8 mm.

12. The tire according to claim 1, wherein a distance between the axially inner end of the outboard middle sub lateral groove and the outboard center main groove is in a range of from 40 to 60% of the axial width of the outboard middle portion.

13. The tire according to claim 1, wherein
each inboard shoulder lateral groove extends from axially outside of the inboard tread edge toward the tire equator and has an axially inner end without reaching the inboard shoulder main groove to form a plain land portion without any sipes between the inner end of the inboard shoulder lateral groove and the inboard shoulder main groove; and
each outboard shoulder lateral groove extends from the axially outside of the outboard tread edge toward the tire equator and has an axially inner end without reaching the outboard shoulder main groove to form a plain land portion without any sipes between the inner end of the outboard shoulder lateral groove and the outboard shoulder main groove.

14. The tire according to claim 2, wherein
each inboard shoulder lateral groove extends from axially outside of the inboard tread edge toward the tire equator and has an axially inner end without reaching the inboard shoulder main groove to form a plain land portion without any sipes between the inner end of the inboard shoulder lateral groove and the inboard shoulder main groove; and
each outboard shoulder lateral groove extends from the axially outside of the outboard tread edge toward the tire equator and has an axially inner end without reaching the outboard shoulder main groove to form a plain land portion without any sipes between the inner end of the outboard shoulder lateral groove and the outboard shoulder main groove.

15. A pneumatic tire comprising:
a tread portion having a left-right asymmetry tread pattern including an inboard tread edge and an outboard tread edge;
an inboard half-tread portion between a tire equator and the inboard tread edge;
an outboard half-tread portion between the tire equator and the outboard tread edge and having a land ratio greater than that of the inboard half-tread portion;
a pair of circumferentially extending inboard and outboard center main grooves disposed both sides of a tire equator to define a center portion there between;
a pair of circumferentially extending inboard and outboard shoulder main grooves disposed an axially outside of the inboard and outboard center main grooves;
a pair of middle portions which include an inboard middle portion defined between the inboard center main groove and the inboard shoulder main groove and an outboard middle portion defined between the outboard center main groove and the outboard shoulder main groove;
a pair of shoulder portions which include an inboard shoulder portion defined by the axially outside of the inboard shoulder main groove and an outboard shoulder portion defined by the axially outside of the outboard shoulder main groove;
a plurality of inboard lateral main grooves extending from the axially outside of the inboard tread edge to the axially inside of the tire beyond the tire equator without reaching the outboard center main groove;
the inboard shoulder portion being provided with a plurality of inboard shoulder lateral grooves, each inboard shoulder lateral groove extending from axially outside of the inboard tread edge toward the tire equator without reaching the inboard shoulder main groove;
the outboard shoulder portion being provided with a plurality of outboard shoulder lateral grooves, each outboard shoulder lateral groove extending from the axially outside of the outboard tread edge toward the tire equator without reaching the outboard shoulder main groove;
the inboard middle portion being provided with a plurality of inboard middle lateral grooves, and each inboard middle lateral groove provided between adjacent inboard lateral main grooves in the circumferential direction of the tire and extending from the inboard shoulder main groove toward the tire equator without reaching the inboard center main groove;
the outboard middle portion being provided with a plurality of outboard middle lateral grooves and a plurality of outboard middle sub lateral grooves;
each said outboard middle lateral groove extending from the outboard shoulder main groove toward the tire equator without reaching the outboard center main groove so as to have an axially inner end terminating within the outboard middle portion;
each said outboard middle sub-lateral groove provided between adjacent outboard middle lateral grooves in the circumferential direction of the tire and extending from the outboard shoulder main groove toward the tire equator without reaching the outboard center main groove so as to have an axially inner end terminating the axially outside than the axially inner end of the outboard middle lateral groove;
the number of outboard middle sub lateral grooves being smaller than that of inboard middle lateral grooves; and
wherein a distance between the axially inner end of the outboard middle lateral groove and the outboard center main groove is in a range of from 3 to 8 mm.

16. A pneumatic tire comprising:
a tread portion having a left-right asymmetry tread pattern including an inboard tread edge and an outboard tread edge;
an inboard half-tread portion between a tire equator and the inboard tread edge;
an outboard half-tread portion between the tire equator and the outboard tread edge and having a land ratio greater than that of the inboard half-tread portion;
a pair of circumferentially extending inboard and outboard center main grooves disposed both sides of a tire equator to define a center portion there between;
a pair of circumferentially extending inboard and outboard shoulder main grooves disposed an axially outside of the inboard and outboard center main grooves;
a pair of middle portions which include an inboard middle portion defined between the inboard center main groove and the inboard shoulder main groove and an outboard middle portion defined between the outboard center main groove and the outboard shoulder main groove;

a pair of shoulder portions which include an inboard shoulder portion defined by the axially outside of the inboard shoulder main groove and an outboard shoulder portion defined by the axially outside of the outboard shoulder main groove;

a plurality of inboard lateral main grooves extending from the axially outside of the inboard tread edge to the axially inside of the tire beyond the tire equator without reaching the outboard center main groove;

the inboard shoulder portion being provided with a plurality of inboard shoulder lateral grooves, each inboard shoulder lateral groove extending from axially outside of the inboard tread edge toward the tire equator without reaching the inboard shoulder main groove;

the outboard shoulder portion being provided with a plurality of outboard shoulder lateral grooves, each outboard shoulder lateral groove extending from the axially outside of the outboard tread edge toward the tire equator without reaching the outboard shoulder main groove;

the inboard middle portion being provided with a plurality of inboard middle lateral grooves, and each inboard middle lateral groove provided between adjacent inboard lateral main grooves in the circumferential direction of the tire and extending from the inboard shoulder main groove toward the tire equator without reaching the inboard center main groove;

the outboard middle portion being provided with a plurality of outboard middle lateral grooves and a plurality of outboard middle sub lateral grooves;

each said outboard middle lateral groove extending from the outboard shoulder main groove toward the tire equator without reaching the outboard center main groove so as to have an axially inner end terminating within the outboard middle portion;

each said outboard middle sub-lateral groove provided between adjacent outboard middle lateral grooves in the circumferential direction of the tire and extending from the outboard shoulder main groove toward the tire equator without reaching the outboard center main groove so as to have an axially inner end terminating the axially outside than the axially inner end of the outboard middle lateral groove; and the number of outboard middle sub lateral grooves being smaller than that of inboard middle lateral grooves, wherein each inboard shoulder lateral groove extends from axially outside of the inboard tread edge toward the tire equator and has an axially inner end without reaching the inboard shoulder main groove to form a plain land portion without any sipes between the inner end of the inboard shoulder lateral groove and the inboard shoulder main groove; and each outboard shoulder lateral groove extends from the axially outside of the outboard tread edge toward the tire equator and has an axially inner end without reaching the outboard shoulder main groove to form a plain land portion without any sipes between the inner end of the outboard shoulder lateral groove and the outboard shoulder main groove.

* * * * *